(No Model.) 2 Sheets—Sheet 1.
J. W. CARLEY.
COMBINED CORN AND COTTON PLANTER, CULTIVATOR, AND COTTON CHOPPER.
No. 378,286. Patented Feb. 21, 1888.
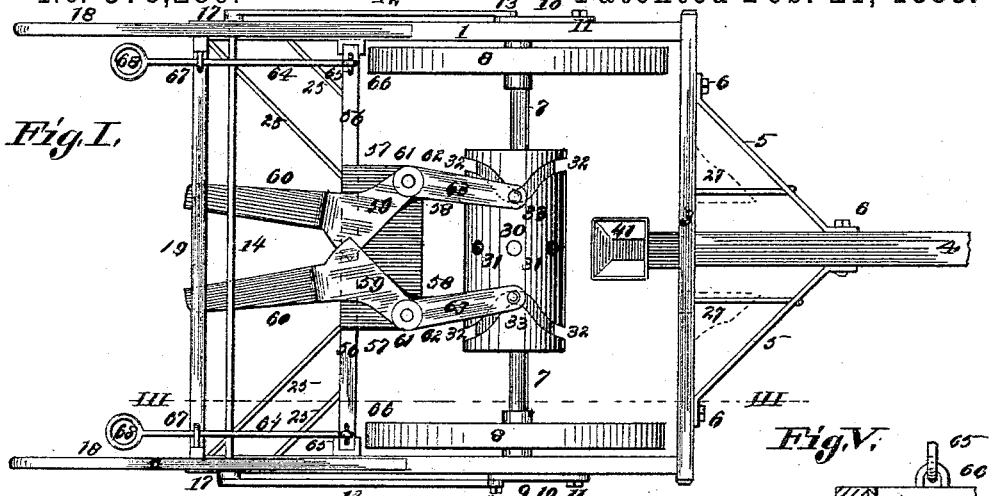
Fig. I.
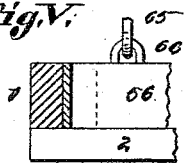
Fig. V.
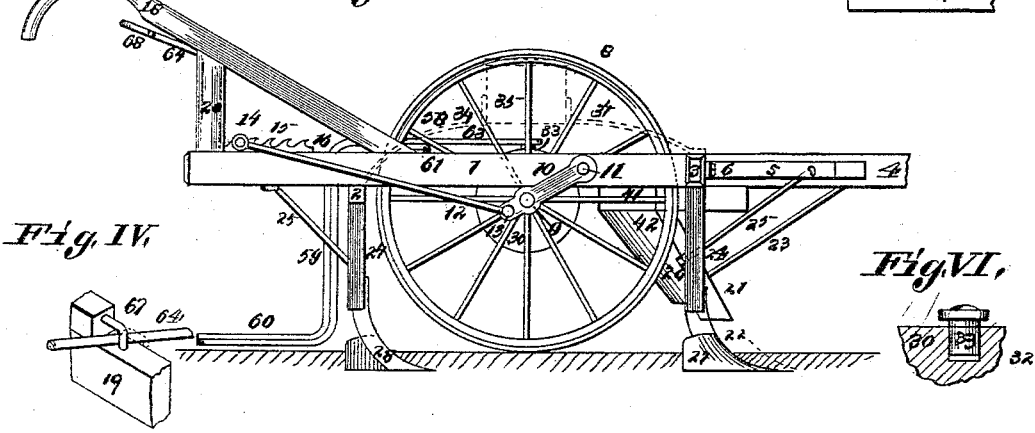
Fig. II.
Fig. IV.
Fig. VI.
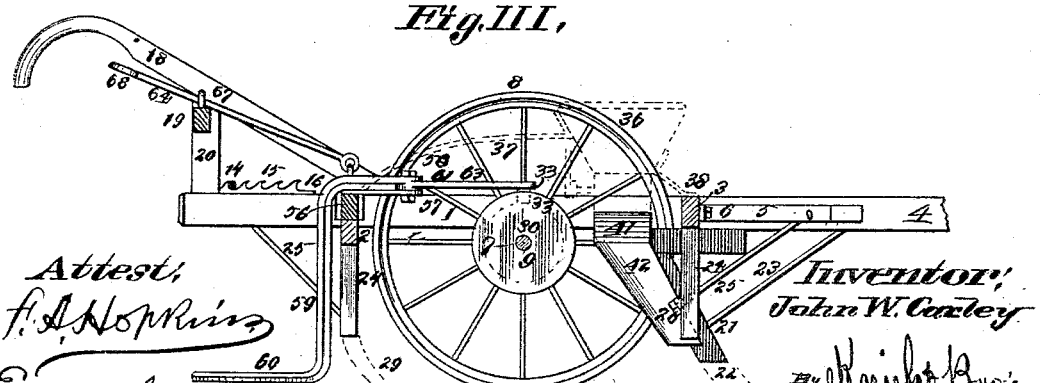
Fig. III.
Attest:
F. A. Hopkins
Emma Arthur
Inventor:
John W. Carley
By Knight Bro's
Att'ys.

(No Model.) 2 Sheets—Sheet 2.
J. W. CARLEY.
COMBINED CORN AND COTTON PLANTER, CULTIVATOR, AND COTTON CHOPPER.
No. 378,286. Patented Feb. 21, 1888.
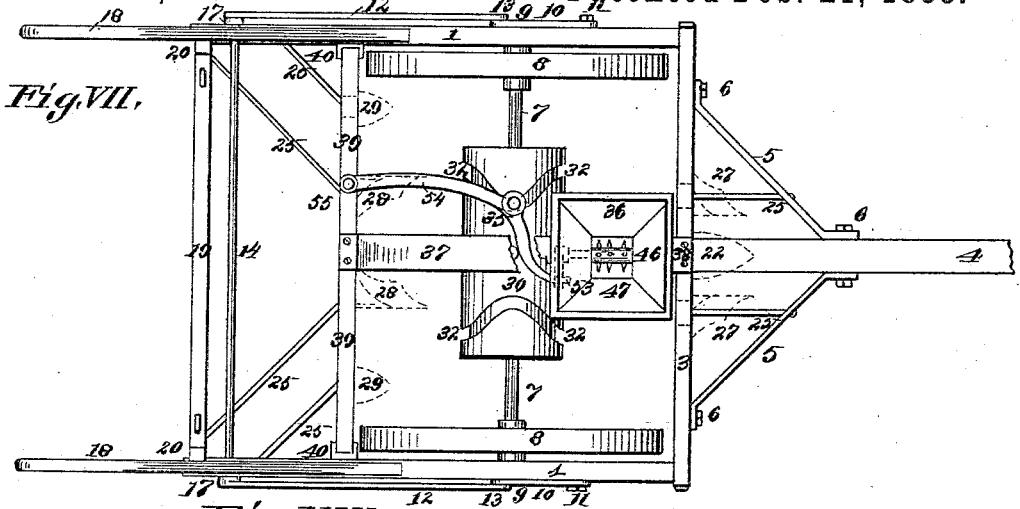
Fig. VII.
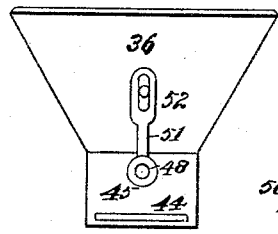
Fig. VIII.
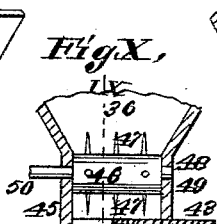
Fig. X.
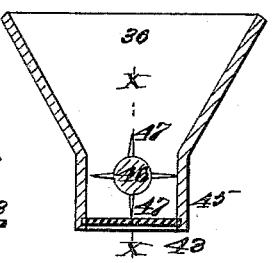
Fig. IX.
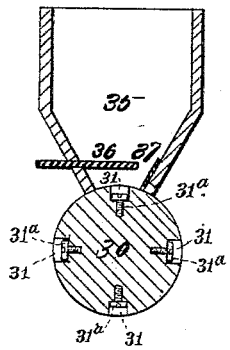
Fig. XI.
Attest:
F. A. Hopkins
Emma Arthur
Inventor:
John W. Carley
By Knight Bro's.
Atty's.

UNITED STATES PATENT OFFICE.

JOHN W. CARLEY, OF THORNTON, TEXAS.

COMBINED CORN AND COTTON PLANTER, CULTIVATOR, AND COTTON-CHOPPER.

SPECIFICATION forming part of Letters Patent No. 378,286, dated February 21, 1888.

Application filed April 11, 1887. Serial No. 234,421. (No model.)

*To all whom it may concern:*

Be it known that I, JOHN W. CARLEY, of Thornton, in the county of Limestone and State of Texas, have invented a certain new and useful Improvement in a Combined Corn and Cotton Planter, Cultivator, and Cotton-Chopper, of which the following is a full, clear, and exact description, reference being had to the accompanying drawings, forming part of this specification, and in which—

Figure I is a top view of my combined machine, showing the action of the shears as cotton-choppers and the eccentric cam-drum that operates them. Fig. II is a longitudinal side view showing the corn-hopper and attachments and the means of elevating and depressing the machine. Fig. III is a longitudinal section on line III III, Fig. I, showing the cultivator-teeth attached and the means of elevating the cotton choppers or shears. Fig. IV is an enlarged detail perspective showing the lever crossing the fulcrum-bar and the pivotal hooks that hold it. Fig. V is an enlarged detail section showing one of the ends of the frame that carries the shears in its slotted seat and the attachment of the lever that elevates it. Fig. VI is an enlarged perspective of one of the friction-rollers that actuate the shears, &c. Fig. VII is a top view showing the cotton-planter attachments. Fig. VIII is an enlarged side view of the cotton-seed hopper with the crank of the cotton-seed agitator. Fig. IX is an enlarged section on line IX IX, Fig. X, showing the same hopper with its adjustable slide, with a transverse view of the agitator within the hopper. Fig. X is an enlarged section on line X X, Fig. IX, and shows the adjustable slide at the delivery end of the hopper and a longitudinal view of the agitator, with the extension-shaft for the attachment of the crank of the agitator; and Fig. XI is an enlarged section of the corn-hopper and roller, and shows the recessed seed-cups in the roller for gaging the amount of seed to be dropped. It also shows the adjustable slide to regulate the advance of the seed to said chambers, and the brush or other strike that levels off the surface of the seed-chambers to equalize the delivery from the same.

My invention relates to the combination and adaptation of devices in one machine relatively for use as a corn and cotton planter, cultivator, and cotton-chopper; and the invention consists in features of novelty hereinafter fully described, and pointed out in the claims.

Referring to the drawings forming part of this specification, in which similar figures indicate like parts in all the drawings, 1 represents the side beams of the main frame of my combination machine, 2 the rear cross-bar, and 3 the front or draft beam, to which the tongue 4 is secured, and to which it is laterally braced by the angle-rods 5 5, that are secured by screw-nutted bolts 6.

7 is the metal axle, to which the ground-wheels 8 8 are rigidly secured, said wheels running, preferably, on the inside of the main frame. The axle runs in bearings 9 in pendent iron straps or bars 10, which are turned on pivot-bolts 11, that are fastened into the side beams of the frame. Elevating-rods 12 are secured by pivot-bolts 13 to the lower end of said strap-bearers, and the upper ends of the rods are secured to a transverse locking-bar, 14, that connects the elevation-rods and works over and in engagement with the teeth 15 of ratchet-racks 16, that are secured on the side beams of the frame to adjustably lock the pivoted straps that form the axle-bearings for the wheels. Bosses 17 on the inside of the upper ends of the elevator-rods project the rods sufficiently from the racks to give them good play, free of interference with the side beams of the frame.

18 are the handles by which the operator guides the machine, and by lifting which he elevates it, and as the stiff tongue bears on the neck-yoke, the gravity of the wheels, axle, and drum, bearing down on the pivoted pendent strap that carries the axle-bearings, draws the locking-bar over the teeth of the rack until, when elevated to the desired height, the operator ceasing to lift the handles, the locking-bar engages in the seat in the rack to which it has attained. The elevation of the machine is thereby adjusted to the depth of the ground to which it is desired to work; or it may be elevated completely out of the ground to pass over obstructions or turn at the headlands, or when removing the machine from place to place. When, on the other hand, it is desired to lower the machine, the handles are slightly raised to loosen the locking-bar in its seat, when said bar is raised above the locking-teeth by hand until the machine is lowered to the extent desired, when the locking-bar is again dropped into its seat and the grasping eagle-beaks of the teeth hold it there. A connecting-rod, 19, couples and braces the handles laterally, and vertical bars 20, that connect said rod to the side beams of the frame beneath the handles, brace the handles vertically.

A standard, 21, is secured to the rear of the tongue and projects forward so as to be more strongly braced to its work, which is to carry the double-mold plow 22, that forms the furrow, in which relatively the corn or cotton-seed is dropped for planting. The mold-board is secured to the standard by the usual screw-nutted bolts, and is to be removed when the machine is used as a cultivator or cotton-chopper. The said standard is re-enforced by the screw-nutted angle-brace 23, that connects the standard to the tongue.

Vertical pendent standards 24, that carry the other plows and cultivator-teeth, are secured above the transverse beams of the frame and braced by angle-rods 25, fastened, relatively, to the tongue-braces and frame, and which angle down through such standards and are secured by nuts 26 at their lower extremities, or by any other suitable means. Side mold-boards, 27, furrowing from the plant-row, are attachable, in like manner to the double-furrow plow, to the standards that are pendent from the forward cross-beam, and similar molds, 28, but furrowing toward the row and hilling up the same, are similarly attached to the two middle standards that are pendent from the rear cross-beam of the frame, and cultivator teeth or blades 29 are attached to the other rear standards. When used as a cultivator, the side molds may, any or all of them, be removed and cultivator-blades 27 be substituted in their place.

An elevated roller, 30, is rigidly secured to the rotary main axle, and has a variety of functions to perform. A series of recessed cups, 31, around the middle of the roller, gage the seed-corn to be dropped at certain intervals, and eccentric cam-grooves 32 near each end, in connection with friction-rollers 33, that work in them, form the actuating-channels that give eccentric movement both to the cotton-seed agitator and the cotton-chopper when, respectively, the machine is either planting cotton-seed or chopping in thinning out the young plants. At the bottom of the recessed cups 31 flat-headed screws 31ᵃ are provided. These screws may be adjusted as desired, in order to change the depth of the cups.

The roller, unlike a ground-roller, runs free of the ground.

When the machine is used as a corn-planter, the double-mold plow is attached to its pendent standard 21, and arched metal strap 34, that bears the seed-corn hopper 35, is secured to the cross-beams of the frame, locating the hopper immediately over and in contact with the rotary roller. An adjustable slide, 36, regulates the approach of the seed to the gaging seed-cups 31, which may be of a size to receive one, two, three, or any number of grains desired for each deposit. Two grains at a time is a common number to drop. A brush or pad, 37, within the hopper, sweeps the roller as it rotates, prevents the escape of seed, except as delivered by the cup, and strikes the surface of the cup to insure even measure in its delivery. It will be seen that as the machine travels across the field the double-mold plow forms the seed-furrow and the seed-cups in the roller drop their given quota of seed into the trench just made, and the single-mold plows that face the trench fill up and form a ridge over it.

When the machine is used as a cotton-seed planter, the corn-seed hopper is removed with its supporting-straps, and the cotton-seed hopper 36 is placed in position in front of the roller and there held and supported by somewhat similar metal-strap bearers, 37, to those used with the corn-hopper. The front strap may be attached, as shown, to the front cross-beam at 38; or, if it is preferred, the strap may extend to and be fastened to the tongue. The rear strap from the hopper extends back and is fastened to a removable cross-bar, 39, that is seated in brackets 40, secured to the side beams of the frame. The hopper delivers into a chute, 41, an extension-tube, 42, from which is attached to the rear of the standard 21, that carries the seed-furrow plow. It will thus be seen that the seed, as it leaves the hopper, is conveyed by the chute and tube direct into the new-opened seed-furrow before it has time to fill in, and cannot be misdirected in its course. A slide, 43, working in the slot 44 in the neck 45 of the hopper, gages the discharge of the seed from the hopper.

To avoid the difficulty that has been frequently experienced from the choking of cotton-seed in its delivery from the hopper in consequence of its fibrous attachment, I provide an agitating-roller, 46, with radial spikes 47, within the neck of the hopper where it delivers into the chute. This roller works on a shaft, 48, that has bearings 49 in the neck of the hopper. An extension, 50, of the shaft is provided with a crank-arm, 51, that rises from it, and said arm has an elongated slot, 52, at its upper end, in which the curved finger 53 of the rocking arm 54 operates. This rocking arm is pivoted at 55 to the cross-bar 39, and is provided with a friction-roller, 33, that works in one of the eccentric grooves 32 in the elevated roller, and thus the curved finger working in the elongated slot of the crank-arm connecting with the shaft of the agitating-roller, its spikes agitate the seed, and thereby prevent its choking within the neck of the hopper, and the seed follows down the chute and tube and is planted instantaneously with the opening of the seed-furrow in an even row. The covering-plows 28, that follow after them, hill up the ridge when it is fresh.

When the machine is used for cotton-chopping, the seed-choppers, with their attachments, having been removed, the shears attachment is substituted, which consists of a removable cross-bar, 56, that is seated in the slots 40, that have been vacated by the cross-bar 39. This cross-bar 56 is provided with a forward extension plate or table, 57, that may be either of metal or wood, and to this table are pivoted at 58 the two metal arms 59 of the shears. From their pivotal connections the said arms curve over the table and downward until on about a level with the ground, at which point, on a horizontal line running parallel with the ground, the two steel blades 60 of the shears are welded; or, when preferred, the arms and blades may be all of steel. The arms of the shears are provided with stiff elbows 61 at their point of pivotal connection with the cross-bar, and are braced on their pivotal seat by broad washers 62, and have extension-arms 63, that reach over the elevated roller, in the eccentric grooves of which pendent friction-rollers 33 engage. It will thus be seen that as the elevated roller rotates the friction-rollers, with their eccentric movement in the grooves, actuate the shears, so as to make the blades clip off the plants to the extent required to form the thinning gaps in the row. This effects the same ends attained by the chopping process in a more perfect manner than could be done by revolving cutters, from which some of the plants are apt to bend before the blow and escape cutting. The well-known action of the shears in all cutting operations is here taken advantage of—namely, it grasps and holds at the very point of cutting that it is about to sever, and in consequence it makes clean definite work.

Fulcrum-levers 64, preferably of metal, are secured to the cross-bar 56 by their hooks or rings 65, which engage with staples 66, or by any other suitable means, and said levers pass over and fulcrum on the connecting-rod 19, that couples the handles together, and are held in their fulcrum-seats by pivoted hooks 67. Stiff rings 68 on the upper ends of the levers form convenient handles, on which the operator presses when he desires, through the fulcrum-lever, to raise the cross-bar to elevate the shears it bears over obstructions.

I have described the operation of my automatic shears as a cotton-chopper; but it may also be used, when desired, for thinning corn where it has been planted in unbroken rows.

When the corn and cotton have been planted and the cotton-chopper has done its work, my combined machine is then changed into a cultivator by the removal of the seeding and chopping or shears attachments with the plow-molds and the substitution of the pendent bars or standards of the cultivator teeth or blades 29.

In all the operations of the machine as a corn-planter, cotton-planter, cotton-chopper, and cultivator the pivoted adjustable axle-bearings, in conjunction with the elevating-rods, with the adjusting-racks that lock them to their elevated or depressed condition, form an important feature in the working of the machine, enabling it to be worked at varied adjustable levels, which is an advantage in corn and cotton planting, in cotton-chopping, and also in cultivating.

When it is desired to elevate the machine, the operator lifts the handles, and as the stiff tongues rest in the neck-yoke ring, the whole frame rises and the gravity of the axle-wheels and roller draws down the pivoted bearings until, having reached the level desired by the operator, he discontinues to lift and the locking-bar engages in the seat to which it has attained in the rack. By this means the depth of working and also the elevating of the machine completely from the ground when it is removed from place to place are effected.

In chopping the cotton out the two side front plows are used as scrapers or for siding the cotton, while the two rear middle plows ridge up the row.

I claim as my invention—

1. The combination, with the frame, of the pivoted axle-straps 10, elevating-rods 12, having locking-bar 14, and the racks 16, having teeth 15, substantially as described.

2. The combination, with the frame, of the removable cross-bar, vertical bars 20, handles 18, connecting-rod 19, and the levers 64, secured to the cross-bar and fulcrumed to the connecting-rod, substantially as described.

3. The combination, with the frame, of the driving-wheels 8, axle 7, roller 30, formed with cam-grooves 32, the cross-bar 56, table 57, arms 59, pivoted to the table, extending rearward and downward, having rearwardly-extending chopper-blades 60, and the forward extensions, 63, having rollers 33 working in the cam-grooves, substantially as described.

JOHN W. CARLEY.

In presence of—
J. W. GRAY,
J. B. GRESHAM.